United States Patent [19]

Watanabe et al.

[11] Patent Number: 4,559,568
[45] Date of Patent: Dec. 17, 1985

[54] APPARATUS FOR RE-RECORDING A DIGITAL SIGNAL ON A RECORD MEDIUM AND FOR REPRODUCING THE SAME THEREFROM

[75] Inventors: Tetsu Watanabe; Masato Tanaka, both of Tokyo, Japan

[73] Assignee: Sony Corporation, Tokyo, Japan

[21] Appl. No.: 459,129

[22] Filed: Jan. 19, 1983

[30] Foreign Application Priority Data

Jan. 19, 1982 [JP] Japan ................................... 57-6328
Jan. 19, 1982 [JP] Japan ................................... 57-6329

[51] Int. Cl.$^4$ ...................... G11B 5/09; G06F 11/00; G06F 11/10
[52] U.S. Cl. ....................................... 360/48; 360/53; 360/54; 371/39
[58] Field of Search ..................... 360/18, 19.1, 25, 27, 360/48, 53, 54; 371/39, 40, 38; 800/38.1, 48

[56] References Cited

U.S. PATENT DOCUMENTS

| | | | |
|---|---|---|---|
| 4,211,997 | 7/1980 | Rudnick et al. | 360/53 X |
| 4,254,500 | 3/1981 | Brookhart | 360/53 X |
| 4,359,772 | 11/1982 | Patel | 371/39 |
| 4,434,487 | 2/1984 | Rubinson et al. | 360/53 X |

FOREIGN PATENT DOCUMENTS

3145560  1/1964  United Kingdom .................. 371/39

OTHER PUBLICATIONS

R. W. Hamming, Coding and Information Theory, 1980, Prentice Hall, Inc., pp. 184–190, 195.
Hsiao, Single Channel Error Correction in an F-Channel System, IEEE Trans. Computers, VC-17, No. 10.

Primary Examiner—Raymond F. Cardillo, Jr.
Assistant Examiner—Alyssa H. Bowler
Attorney, Agent, or Firm—Lewis H. Eslinger; Alvin Sinderbrand

[57] ABSTRACT

An apparatus for re-recording a new digital signal in a track on a magnetic record medium which has a previously recorded digital signal in the track, the digital signal being arranged in data blocks each containing a sync signal, a data signal, an error correction code signal, and an error detection code signal, comprises a reproducing circuit which reproduces each digital signal recorded on the magnetic record medium, a code generating circuit which supplies a discriminating code signal for each of the data blocks, and a recording circuit which re-records the new digital signal and the respective discriminating code signals in the track on the magnetic record medium.

12 Claims, 30 Drawing Figures

APPARATUS FOR RE-RECORDING A DIGITAL SIGNAL ON A RECORD MEDIUM AND FOR REPRODUCING THE SAME THEREFROM

BACKGROUND OF THE INVENTION

1. Field of the Invention

This invention relates to apparatuses for recording and reproducing a digital signal, and more particularly, to an apparatus for re-recording a digital signal which adds a discriminating signal to the previously recorded digital data to prevent erroneous error correction.

2. Description of the Prior Art

In a digital tape recorder, when new data is recorded over data which has been previously recorded, or when new data is recorded in a track after the first recorded data has been erased, the accumulation of dust on the tape can cause an erasing omission or recording omission so that the new data is not properly recorded. After the re-recording operation has been performed, and the dust is removed from the surface of the magnetic tape, the originally recorded data is included with the new data on the track where the dust had previously accumulated. When the original or first recorded data is reproduced along with the new data, it is difficult to detect such a condition and the resulting influence upon the signal processing.

When a re-recording operation is performed with dust accumulated on the magnetic tape, a significant length of the tape, for example, as much as 200 microns, may not be properly recorded.

By reason of the foregoing, in the case of an audio pulse coded mudulation tape recorder, abnormal sounds may be generated when the first recorded data is reproduced along with the new data.

OBJECTS AND SUMMARY OF THE INVENTION

It is therefore an object of the present invention to provide an improved apparatus for recording and reproducing a digital signal.

More specifically, it is an objet of the present invention to provide an apparatus for recording and reproducing a digital signal which is not adversely affected when dust accumulates on the recording medium.

It is another object of the present invention to provide an apparatus for recording and reproducing a digital signal, as aforesaid, and in which a discriminating code signal is added and recorded along with the data, and the presence or absence of the first recorded data before re-recording is detected from the discriminating code signal.

In accordance with an aspect of the present invention, an apparatus for re-recording a new digital signal in a track on a magnetic record medium which has a previously recorded digital signal in the track, each digital signal being arranged in data blocks each containing a sync signal, a data signal, an error correction code signal, and an error detection code signal, comprises reproducing means for reproducing the digital signal recorded in the track on the magnetic record medium, code generating means for supplying a discriminating code signal for each of the data blocks and recording means for re-recording the new digital signal and the respective discriminating code signals in the track on the magnetic record medium.

The above, and other objects, features and advantages of the present invention will be apparent from the following detailed description of illustrative embodiments thereof which is to be read in connection with the accompanying drawings.

DESCRIPTION OF THE PREFERRED EMBODIMENTS

In an apparatus for recording and reproducing digital data, such as a pulse coded modulation tape recorder or the like, when new data is recorded over the first recorded data on a magnetic recording medium such as magnetic tape, or when new data is recorded after the first recorded data has been erased, an erasing omission or recording omission can occur so that the new data is not recorded if dust accumulates on the tape. As long as the dust remains on the tape, the first recorded data cannot be reproduced. However, when the dust has been removed from the tape, the first recorded data can be reproduced along with the new data. Since it is difficult to detect when an erasing or recording omission has occurred, the reproduced signal from the magnetic tape can be erroneous.

Figure 1A:
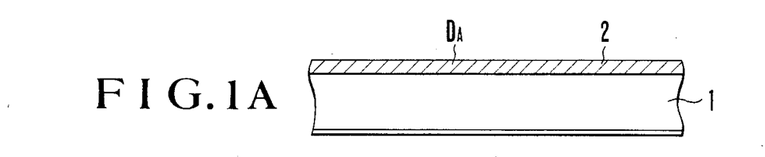
FIGS. 1A to 1C are diagrammatic, cross-sectional views of magnetic tape used in a conventional pulse coded modulation tape recorder.
Figure 1B:
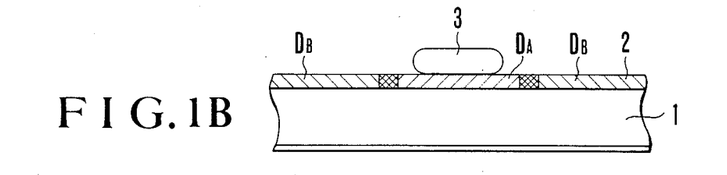

Referring to the drawings in detail, and initially to FIG. 1A thereof, a magnetic tape 1 is there represented as having first recorded data $D_A$ recorded on a magnetic layer 2, with such first recorded data being indicated by the obliquely slanted lines. As illustrated in FIG. 1B, dust 3 can accumulate on the surface of magnetic tape 1. When magnetic tape 1 is recorded over, or re-recorded, with new data $D_B$, an erasing or recording omission can occur under dust 3 where the first recorded data $D_A$ remains between two sections of newly recorded data $D_B$. The foregoing result of dust 3 can be caused by other phenomena, for example, a portion of magnetic layer 2 which has peeled away, or by accumulations of oil, cotton, etc. on the tape.

Figure 1C:
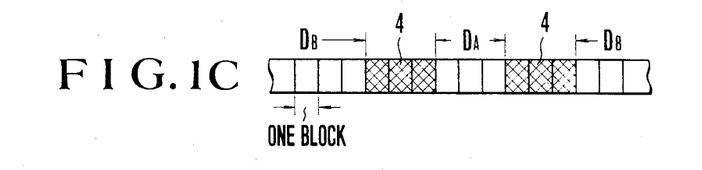
Figure 2:
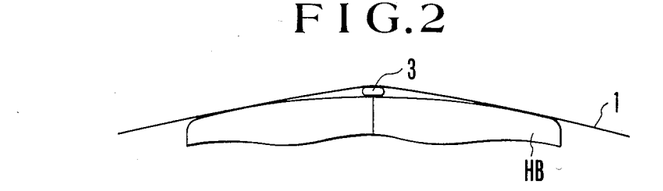
FIG. 2 is a diagrammatic, cross-sectional view of a recording head of a conventional pulse coded mudulation tape recorder with magnetic tape positioned in association therewith.

As illustrated in FIG. 2, a recording head HB has a surface of predetermined curvature with which magnetic tape 1 is brought into contact. When magnetic tape 1 is to be recorded on with dust 3 attached thereto, dust 3 keeps magnetic tape 1 from contacting recording head HB and is thus spaced a distance therefrom. It is to be appreciated that recording head HB generates a magnetic field to perform the recording operation on magnetic tape 1. Thus, when magnetic tape 1 is not in intimate contact with recording head HB, information is not properly recorded on magnetic tape 1. It is to be further appreciated from FIG. 2 that the length of magnetic tape 1 which is not in contact with recording head HB, and thus, not influenced by the magnetic fields from the recording head, is significantly longer than the length of a particle of dust 3. For example, if magnetic layer 4 has a thickness of four microns, the distance between magnetic tape 1 and a center gap of recording head HB is more than one micron. In such case, the length of magnetic tape 1 where recording is not properly performed may be approximately 210 microns. As illustrated in FIG. 1C, boundary sections 4 will be disposed between the first or earlier recorded data $D_A$ and the subsequently recorded date $D_B$, with erroneous data being contained in such boundary section 4.

When magnetic tape 1 is reproduced with dust 3 attached thereto, the portion of magnetic tape 1 where dust 3 is attached is detected as a drop-out since data $D_A$ thereunder is not reproduced. An error correcting or compensating operation is accordingly performed, so that the influence of the drop-out is significantly reduced or even eliminated. However, when dust 3 is removed from magnetic tape 1, such as, for example, by the frictional forces which are generated between magnetic tape 1 and magnetic head HB or between magnetic tape 1 and a tape guide, the reproduced data includes the first recorded data $D_A$ positioned between boundary sections 4 containing error data, as shown in FIG. 1C. It is to be appreciated that the area divided by the vertical lines of FIG. 1C each represent one block of data, and occupy a length of, for example, 180 microns. As illustrated in FIG. 1C, the first recorded data $D_A$ comprises three blocks of data. Since the first recorded data $D_A$ is not detected as in error, it is included in the reproduced signal from magnetic tape 1, and can comprise, for example, unusual or abnormal sounds because no error correction is performed thereon.

Figure 3:
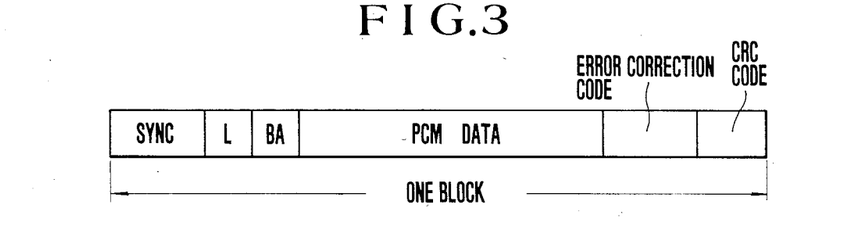
FIG. 3 is a schematic diagram illustrating the composition of a data block in accord with the present invention.

FIG. 3 illustrates one block of data recorded in accord with the present invention. A block sync signal SYNC is recorded at the beginning of the data block, followed by 3 bits of hierarchy data L, and a block address BA. Block address BA is an address in the sector address and is determined by an address code recorded in a longitudinally positioned control track on magnetic tape 1. In an illustrative embodiment, a sector is comprised of four blocks of two bits each. A plurality of words of pulse coded modulation data comprising an audio pulse coded modulation (PCM) signal follow block address BA. An error correction code follows the pulse coded modulation data forming the audio PCM signal. The error correction code can comprise, for example, an interleave code and two parity codes. A CRC code for error detection is added at the last position in the block of data.

A first parity code can be derived from a plurality of words of the PCM data, and a second parity code can be derived from a plurality of words formed after interleave processing has been performed on the PCM data. (It is to be appreciated that, in an interleave processing operation, the data is rearranged by a delay operation.) Accordingly, the ability to correct errors in the PCM data is improved with such processing since each word of PCM data is included in the two series of words from which the parity codes are derived.

Alternatively, an interleave processing operation can be performed and then first and second parity codes can be derived from two series of digital words comprising even numbered words and odd numbered words. In the second method, the PCM data is divided into odd numbered words and even numbered words, respectively.

It is to be appreciated that an error correction code other than a parity code can be used. The CRC code is used to perform an error check for the data comprising hierarchy data L, block address BA, PCM data, and the error correction code.

Figure 4:
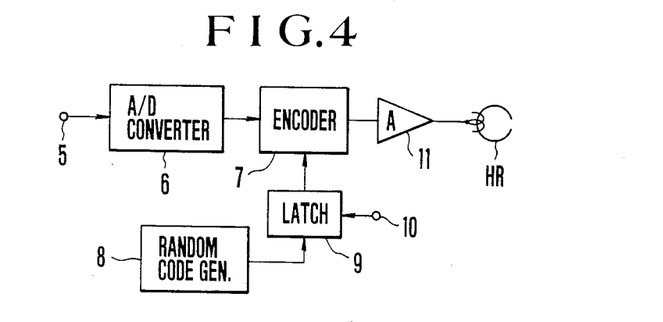
FIG. 4 is a block diagram of an embodiment of a recording circuit in accordance with the present invention.

Referring to FIG. 4, it will be seen that a recording circuit in accordance with the present invention is there shown for recording in one of a plurality of parallel tracks on a magnetic medium, for example, a magnetic tape having 24 tracks which are recorded in parallel. Data in accordance with the present invention is recorded in each track at a rate of one channel per track. A recording head HR (FIG. 4) and a playback head HP (FIG. 5) are provided for each track on the magnetic tape.

In FIG. 4, an audio signal to be recorded is supplied from an input terminal 5 to an analog-to-digital converter 6 which digitizes the audio signal supplied thereto. The digitized audio signal is supplied to an encoder 7. A random code generator 8 supplies an output signal to a latch 9. A latch pulse from an input terminal 10 is supplied to latch 9 whereby two bits are supplied to encoder 7 as hierarchy data. Encoder 7 performs signal processing operations on the digitized audio signal, such as interleaving, parity production, sync signal generation, block address generation, the addition of hierarchy data, and the like, and generates data in accordance with FIG. 3. Encoder 7 supplies the data to recording head HR through a recording amplifier 11 for recording in a respective track on the magnetic tape. Random code generator 8 generates a random code which can comprise, for example, a three-bit combination which varies arbitrarily. The three-bit code is selected as hierarchy data by latch 9 at the start of a recording operation or at the beginning of each plurality of data blocks.

Figure 6A:
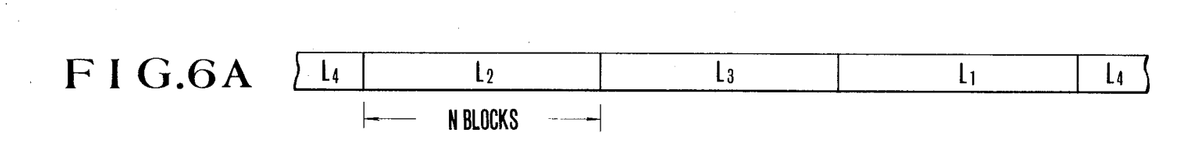
FIGS. 6A and 6B are schematic diagrams to which reference will be made in explaining the operation of the circuits of FIGS. 4 and 5.
Figure 6B:
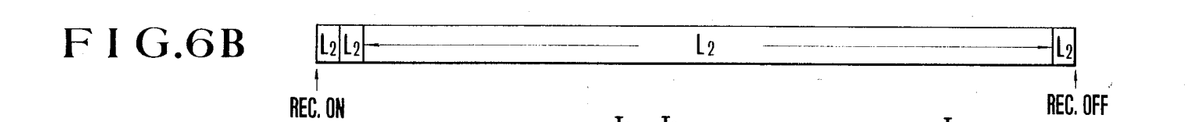

FIG. 6A illustrates one format for the hierarchy data in which the data is added one by one to each of the N blocks. FIG. 6B illustrates an alternate format for the hierarchy data in which the hierarchy data, for example, $L_2$, is added at the start of the recording operation and remains the same for each block until the recording ends. Either of the formats illustrated in FIGS. 6A and 6B can be selected for use with the present invention.

In FIG. 6A, the reference letters $L_1$, $L_2$, $L_3$, ... indicate hierarchy data which are different from each other. It is highly unlikely that the hierarchy data as described above will coincide with the hierarchy data which has been previously recorded in the same track on the magnetic tape. In the case of the format of FIG. 6A, in which the hierarchy code varies randomly, it is possible to extremely reduce the likelihood that the first recorded data will completely coincide with the later recorded hierarchy data, even though there may be partial coincidence between the previously recorded hierarchy code and the newly generated hierarchy code.

In the format of FIG. 6B, the larger the number of kinds of hierarchy data that are generated, the smaller is the probability of coincidence between two randomly generated hierarchy data.

Figure 5:
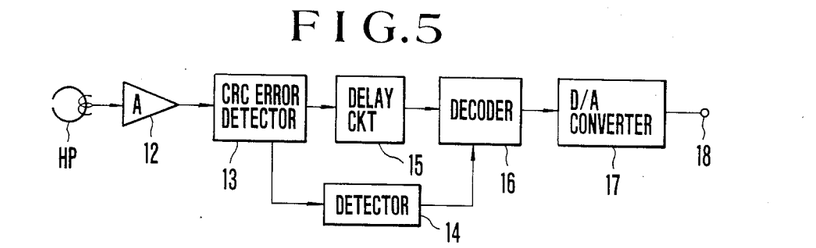
FIG. 5 is a block diagram of an embodiment of a reproducing circuit in accordance with the present invention.

In the reproducing circuit of FIG. 5, the reproduced data from playback head HP is supplied to a reproduction amplifier 12, and thence, to a CRC error detection circuit 13. The result of the error detection by CRC error detection circuit 13 is added to the PCM data and to the error correction code. The detection result can be, for example, a one bit error flag which is "1" if an error is detected and a "0" if no error is detected. At the same time, the hierarchy data which is not in error is also supplied to a detector circuit 14. Detector circuit 14 generates a mismatch detection output signal in response to the error detection result. A delay circuit 15 receives the error detection result from CRC error detection circuit 13 and delays the signal for the time necessary for detector circuit 14 to generate the mismatch detection output signal. The delayed signal from delay circuit 15 and the output signal from detector circuit 14 are supplied to a decoder 16. Decoder 16 includes a time base correcting circuit, a deinterleaving circuit which performs the inverse of the interleaving process, an error correction circuit, an error compensating circuit, etc. The time base corrector circuit of decoder 16 forceably generates an error flag to indicate an error in response to the mismatch detection output signal from detector circuit 14. The output signal from decoder 16 is supplied to a digital to analog converter 17, and a reproduced analog signal, for example, an audio signal, is supplied to an output terminal 18.

Figure 7:
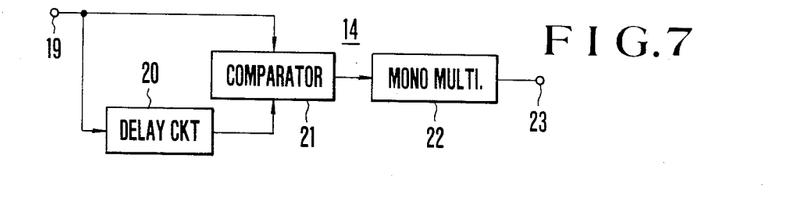
FIG. 7 is a block diagram illustrating an embodiment of a detector circuit in accord with the present invention.

Referring to FIG. 7 it will be seen that, in a circuit for detector circuit 14 of FIG. 5, the hierarchy data is supplied from an input terminal 19 through a delay circuit 20 to one input of a comparator 21, and also directly to another input of comparator 21. Although the hierarchy data comprises only a portion of one data block, the hierarchy data from input terminal 19 is expanded to a length of one data block by an appropriate padding operation. Delay circuit 20 delays each data block supplied thereto by the time corresponding to one block, so that comparator 21 compares the current data block with the previous data block. A comparison output signal from comparator 21 is a "1" if the two input signals supplied thereto differ. When the comparison output signal from comparator 21 is a "1", the rising portion thereof triggers a monostable multivibrator 22 (otherwise known as a one-shot) which supplies a mismatch output signal to an output terminal 23. Monostable multivibrator 22 generates a mismatch output signal which is a "1" over an n-block interval. The length of each n-block interval is selected so that it is longer than the maximum length of a recording omission where the previously recorded data can remain due to, for example, the accumulation of dust on the magnetic tape.

The detector circuit of FIG. 7 is supplied with hierarchy data which is the same for all data blocks recorded from the recording start time to the recording end time. On playback, if different hierarchy data is detected, a mismatch output signal which is "1" in the n-block interval is generated, so that the reproduced n-block data is identified as erroneous. The erroneous data is accordingly processed by an error correction or error compensating circuit in decoder 16.

Figure 8:
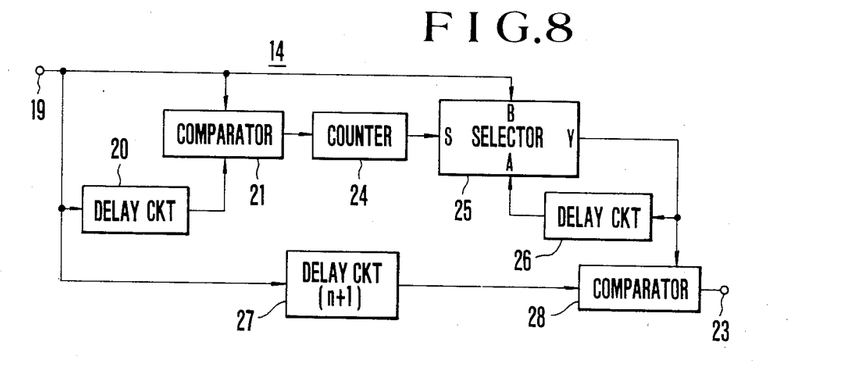
FIG. 8 is a block diagram of an alternate embodiment of a detector circuit in accord with the present invention.

FIG. 8 illustrates another circuit for detector circuit 14 in which a detection counter 24 is connected to the output terminal of comparator 21 described with reference to FIG. 7 and generates an output signal of "1" when the hierarchy data associated with the current data block is identical with the hierarchy data of the previous data block for a period of n-blocks. Detection counter 24 generates an output signal of "0" when the hierarchy data from the two data blocks do not coincide. A selector circuit 25 has an input terminal S at which it receives and is controlled by the output signal from detection counter 24. The reproduced hierarchy data from input terminal 19 is applied to an input terminal B of selector circuit 25 which, when the output signal from detection counter 24 is "1", delivers the reproduced hierarchy data through an output terminal Y to an input terminal of a comparator 28. The hierarchy data from terminal Y is also supplied through a delay circuit 26 to an input terminal A of selector circuit 25 and, when the output signal from detection counter 24 is "0", selector circuit 25 supplies from terminal A to output terminal Y the hierarchy data held in delay circuit 26. In the illustrative embodiment, delay circuit 26 holds the digital data for the time corresponding to one data block. Another input of comparator 28 receives the reproduced hierarchy data delayed by n+1 blocks in a delay circuit 27. If the output signal from selector circuit 25 does not coincide with the hierarchy data from delay circuit 27, a mismatch output signal of "1" is supplied from comparator 28 to output terminal 23.

The detector circuit of FIG. 8 can be supplied with hierarchy data having either the format of FIG. 6A or the format of FIG. 6B. In the example shown on FIG. 9A, the hierarchy data $L_1$ supplied to input terminal 19 changes to $L_2$ during the interval of the two blocks which respectively begin and end at the times $T_1$ and $T_2$. The hierarchy data changes to $L_4$ in the interval beginning at time $T_3$. It is to be appreciated that the reference letters $L_1$, $L_2$, and $L_4$ indicate hierarchy data which differ from each other. As illustrated in FIG. 9B, comparator 21 generates a comparison output signal which is "1" at the time of a mismatch, that is, at the time of lack of correspondence between the hierarchy data of the current data block and that of the previous data block. In response to the comparison output signal from comparator 21 shown on FIG. 9B, detection counter 24 generates an output signal as shown on FIG. 9C. As earlier noted, the output from selector circuit 25 is the current data block when the output from detection counter 24 is "1" and the output of circuit 25 is the previous data block when the output of detection counter 24 is "0". Therefore, in the example given, the output signal from selector circuit 25 is as shown on FIG. 9D in which, the time $T_4$ when the hierarchy data changes from $L_1$ to $L_4$ in the output of circuit 25 is shown to be delayed by n+1 blocks from the time $T_3$ when the change from $L_1$ to $L_4$ occurs in the reproduced hierarchy data. Further, the reproduced hierarchy data supplied to comparator 28 through delay circuit 27 is delayed by n+1 blocks, as shown on FIG. 9E, with the result that the mismatch output signal generated by comparator 28 and shown on FIG. 9F is "1" only in the interval of the abnormal or incorrect hierarchy data $L_2$.

Figure 9A:
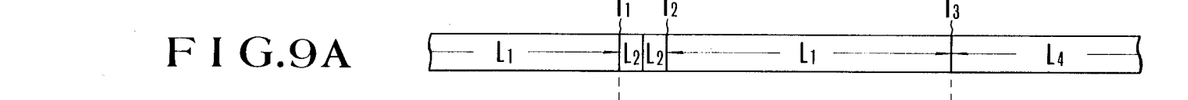
FIGS. 9A–9F are timing diagrams forming a timing chart to which reference will be made in explaining the operation of the detector circuit of FIG. 8.
Figures 9B, 9C:
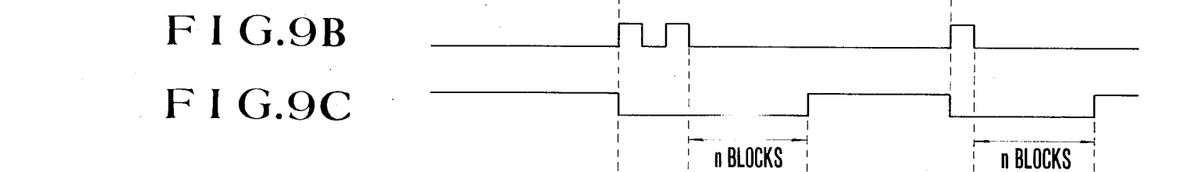
Figure 9D:
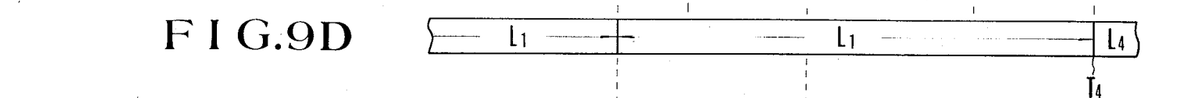
Figures 9E, 9F:
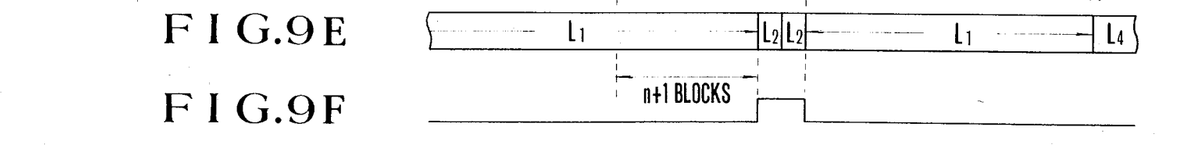

In the example illustrated in FIG. 9A, the hierarchy data $L_2$ appearing only in the short time period from time $T_1$ to time $T_2$ relates to the previous or first recorded data and is reproduced only when the dust has been removed after an erasing or recording omission has occurred by reason of such dust. The hierarchy data $L_4$ occurring for the interval of n blocks after time $T_3$ is of such length as to be associated with data which has been properly recorded.

The shortest possible time from recording ON to recording OFF for the pulse coded modulation tape recorder determines the length of time over which the hierarchy data has to extend to be identified as correct. According to the present invention, each word includes an error correction code with two parity codes. The words which are used to generate the parity codes are recorded on the magnetic tape at dispersed positions because of the interleave processing. In order to prevent an error caused by a recording on or a recording off from extending to more than two words in each parity series, the interval for only a predetermined number of blocks is even if the recording on and recording off is instantaneously performed.

It will be appreciated from the above that, in accordance with the present invention, if an erasing omission or recording omission occurs during a re-recording operation due to the presence of dust on the magnetic tape at that time, and if the first or originally recorded data is included in the data reproduced after the dust is removed, it is possible to detect the first recorded data merely by identifying and detecting the hierarchy data associated therewith, thereby avoiding an otherwise erroneous error correction operation in which no error correction is performed. Since the hierarchy data for the newly recorded data is generated independently of the hierarchy data for the first recorded data, an embodiment of the present invention can be utilized even in a PCM tape recorder which does not include a playback head positioned before the recording head, so that simultaneous recording and playback operation without monitoring can be performed as well as a recording only operation.

Figure 10:
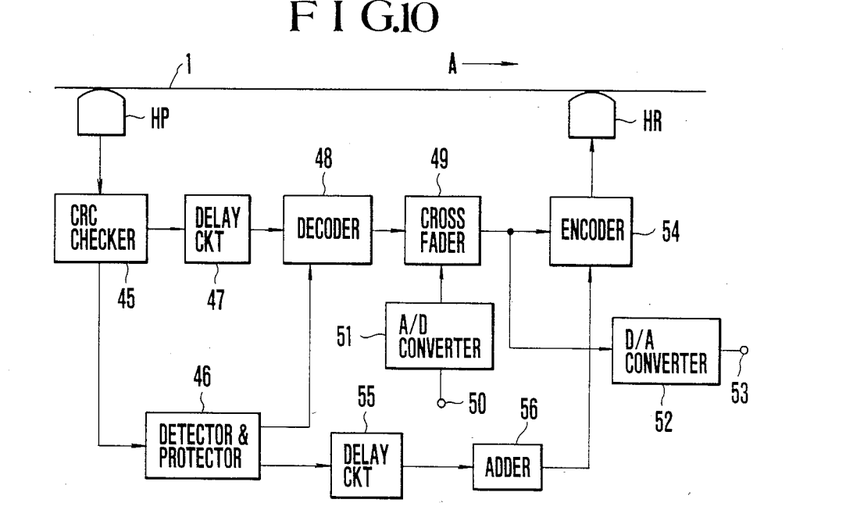
FIG. 10 is a block diagram illustrating an embodiment of a recording and reproducing circuit in accord with the present invention.

FIG. 10 illustrates an alternate embodiment of the present invention for application to a PCM tape recorder in which a playback head HP is positioned before the recording head HR so that so-called "punch-in" and "punch-out" editing can be performed with respect to PCM digital data recorded on the magnetic tape 1 transported in the direction indicated by arrow A. It is to be appreciated that a point on magnetic tape 1 passes playback head HP before the same point passes recording head HR. As described before, a plurality of tracks are recorded in parallel on magnetic tape 1 and can be, for example, 24 in number. Data is recorded on magnetic tape 1 in accord with the illustration of FIG. 3 at a rate of one channel per track. It is further to be appreciated that one playback head HP and one recording head HR are provided for each track, from which it follows that FIG. 10 illustrates the circuit for only one track.

The data reproduced by playback head HP is supplied to a CRC checker 45 through a reproduction amplifier (not shown), and an error detection operation is performed with respect to the CRC code included in the reproduced digital data. CRC checker 45 generates an error detection result signal which is added to the PCM data and to each word of the error correction code. The error detection result signal can comprise, for example, a one bit error flag which is "1" if an error is detected and "0" if no error is detected. The hierarchy data which has been identified as error-free is supplied to a detector and protector circuit 46. Detector and protector circuit 46 provides a mismatch detection output signal to a decoder 48 in response to changes in the hierarchy data supplied thereto. Circuit 46 also provides the current, correct hierarchy data (hereinafter sometimes referred to as protected data). The reproduced data from CRC checker 45 is also supplied to decoder 48 through a delay circuit 47. Delay circuit 47 delays the signal supplied thereto by an amount corresponding to the time necessary for detector and protector circuit 46 to generate its mismatch detection output signal. Decoder 48 includes a time base corrector, a deinterleave circuit which performs the inverse of the interleaving operation, an error correction circuit, an error compensating circuit, etc. As described hereinbefore, the time base corrector generates an error flag to indicate an error in response to the mismatch detection output signal from detector and protector circuit 46.

The reproduced audio PCM signal is supplied from decoder 48 to a cross-fader 49. A second audio signal from an audio input terminal 50 is supplied to an analog-to-digital converter 51 and thence, to cross-fader 49. When punch-in editing is performed, the data is processed so that the level of the first recorded PCM data being reproduced is gradually decreased while the level of the new PCM data being recorded is gradually increased. When a punch-out editing operation is performed, the levels of the PCM data are varied inversely to the foregoing. It is to be appreciated that cross-fader 49 can be replaced by a suitable switch which will effect the change-over between the levels of the two signals. The output signal from cross-fader 49 is supplied to a digital to analog converter 52 which generates an analog audio signal to be supplied to an audio output terminal 53. At the same time, the output signal from cross-fader 49 is supplied to an encoder 54 which performs such processing operations as interleaving, parity production, sync signal addition, and the like, so as to provide data in accordance with the arrangement shown on FIG. 3. The data from encoder 54 is supplied to recording head HR through a recording amplifier (not shown) for recording on magnetic tape 1.

The protected data from detector and protector circuit 46 is supplied to a plus one (+1) adder 56 through a delay circuit 55 to produce hierarchy data for the data to be synchronously recorded. The hierarchy data from plus one adder 56 is supplied to encoder 54 and added to the new data. Delay circuit 55 provides a predetermined delay corresponding to the distance between playback head HP and recording head HR for the synchronous recording of the data.

Figure 11:
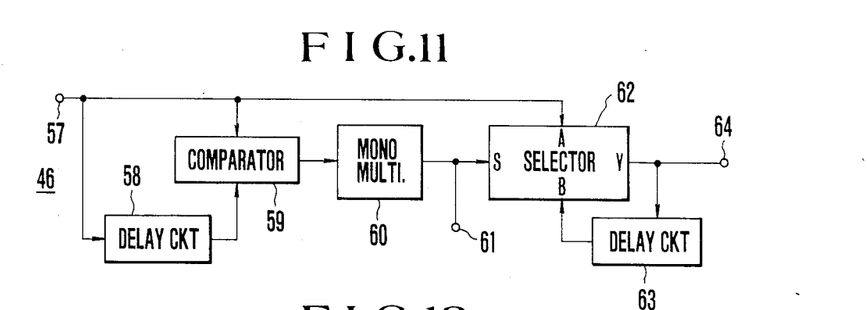
FIG. 11 is a block diagram illustrating an embodiment of a protector and detector circuit used in the embodiment of FIG. 10.

FIG. 11 illustrates one embodiment of detector and protector circuit 46 of FIG. 10 in which the reproduced hierarchy data is supplied at an input terminal 57 to a delay circuit 58 and a comparator 59. Although the hierarchy data is located in only a portion of one block, as described before, the hierarchy data supplied to input terminal 57 is expanded to the length of a full block by an appropriate padding operation. Comparator 59 generates a comparison output signal which is "1" if the two inputs supplied thereto are different. The rising edge of the comparison output signal is supplied to a monostable multivibrator 60 which supplies a mismatch output signal to an output terminal 61 in response to the comparison output signal from comparator 59. The mismatch output signal is "1" for an interval of n-blocks when multivibrator 60 is triggered. The length of n-blocks is selected to be larger than the maximum length of an interval in which a recording or erasing omission can occur, for example, due to dust on the tape.

Figure 12A:
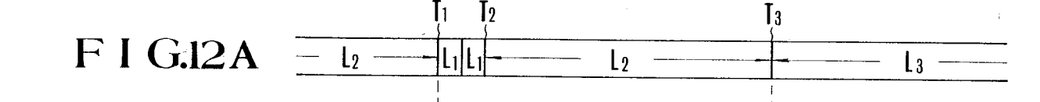
FIGS. 12A–12D are timing diagrams forming a timing chart to which reference will be made in explaining the operation of the circuit of FIG. 11.
Figures 12B, 12C:
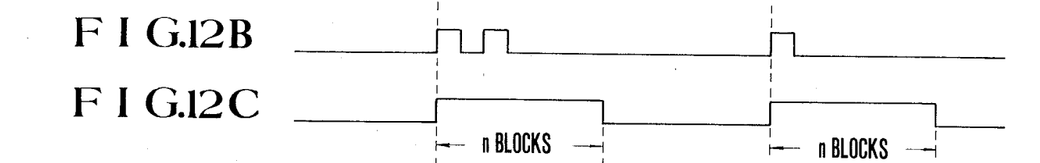

Referring to FIG. 12A, it will be seen that the reproduced hierarchy data supplied to input terminal 57 changes from $L_2$ to $L_1$ at the time interval beginning with the time $T_1$. The hierarchy data continues as $L_1$ for the two blocks ending at time $T_2$. During the time interval beginning with the time $T_2$, the hierarchy data changes back to $L_2$. At the time interval beginning at time $T_3$, the hierarchy data changes further to $L_3$. It is to be appreciated that the reference letters $L_1$, $L_2$ and $L_3$ indicate respective hierarchy data which are different from each other. As illustrated in FIG. 12B, comparator 59 generates a comparison output signal which is "1" in the case of a mismatch between the current hierarchy data and that of the previous block. The rising part of the comparison output signal triggers monostable multivibrator 60 to deliver a pulse to selector circuit 62 which is similar to the selector circuit 25 described with reference to FIG. 8. As illustrated in FIG. 12C, comparator 59 generates a mismatch output signal which is "1" in the n-block intervals which start at the times $T_1$ and $T_3$, respectively. The end-block PCM data and the error correction code are thus identified as erroneous data. In FIG. 12A, the hierarchy data $L_1$ during the short time period beginning with time $T_1$ and ending at time $T_2$ is associated with the previously recorded data on the magnetic tape and has been read only because the dust has been removed. The hierarchy data $L_3$ for the long interval which begins at time $T_3$ is the properly recorded data.

It is to be appreciated that the detector and protector circuit of FIG. 11 identifies the subsequent n-block data as error data even at a normal change point in the hierarchy data.

Figure 12D:
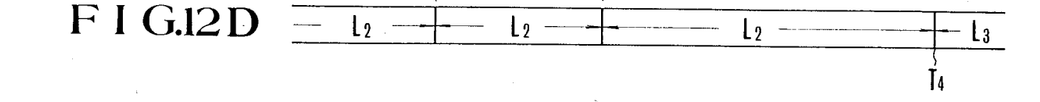

Selector circuit 62 and a one block delay circuit 63 combine to generate protected data which is supplied from an output Y of circuit 62 to an output terminal 64. Selector circuit 62 receives the reproduced hierarchy data and the protected data which has been delayed by one block at inputs A and B, respectively, and supplies the hierarchy data from delay circuit 63, that is, from input B to output Y, when the mismatch output signal applied from monostable multivibrator (MM) 60 to input S is "1". In other words, if a mismatch is detected, the protected data supplied to output terminal 64 is the data which has been delayed by delay circuit 63. Otherwise, the current hierarchy data is supplied to output terminal 64. The protected data generated in response to the reproduced hierarchy data of FIG. 12A is illustrated in FIG. 12D in which the erroneous hierarchy data $L_1$ has been eliminated. It is to be appreciated that the position on the tape which corresponds to the time $T_3$, when the magnetic tape is positioned adjacent recording head HR, coincides with the point on the magnetic tape indicated at the time $T_4$ when the data is to be recorded. It is to be further appreciated that the hierarchy data included in the data to be recorded includes the number one added thereto.

Figure 13:
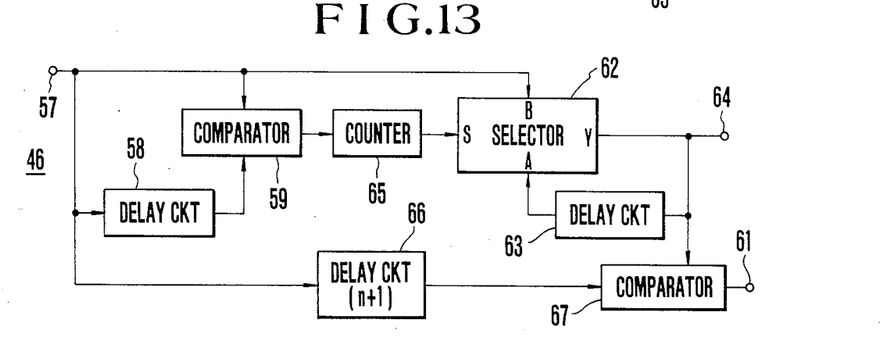
FIG. 13 is a block diagram illustrating an alternate protector and detector circuit used in the embodiment of FIG. 10.
Figure 14A:
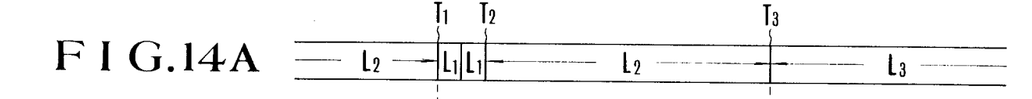
FIGS. 14A–14F are timing diagrams forming a timing chart to which reference will be made in explaining the operation of the circuit of FIG. 13.
Figure 14B:
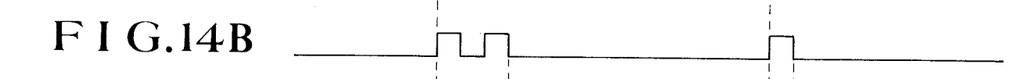
Figure 14C:
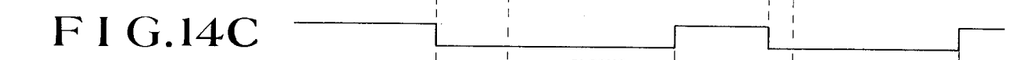

FIG. 13 illustrates another embodiment of a circuit that can be used for a detector and protector circuit 46. When the reproduced hierarchy data shown in FIG. 14A is supplied to the circuit of FIG. 13, comparator 59 generates a comparison output signal as indicated in FIG. 14B. The comparison output signal is supplied to a detection counter 65 which generates an output signal of "1" if the current data and the data from the preceding block coincide with each other for n-successive blocks. Detection counter 65 generates an output signal of "0" whenever the hierarchy data of the current block does not coincide with that of the prior block. The output signal is illustrated in FIG. 14C.

Figure 14D:
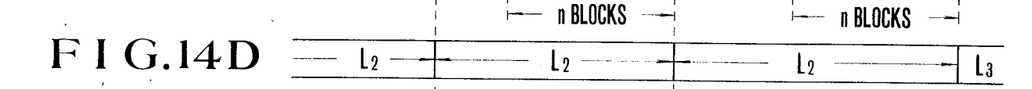
Figure 14E:
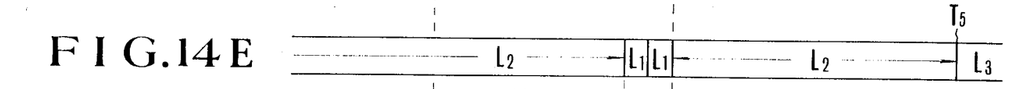
Figure 14F:
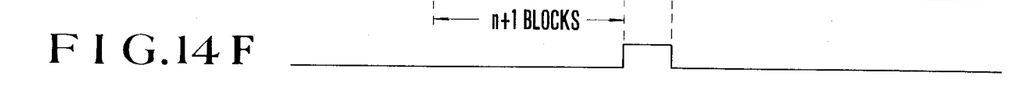

When the output signal from detection counter 65 is "1", selector circuit 62 selects, as its output, the reproduced hierarchy data from input terminal 57. When the output signal from detection counter 65 is "0", selector circuit 62 selects as its output the hierarchy data held in one block delay circuit 63. Thus, the protected data supplied to output terminal 64 is as illustrated in FIG. 14D. Delay circuit 66 delays the reproduced hierarchy data by n+1 blocks and then supplies it to a comparator 67. The reproduced hierarchy data, as received through delay circuit 66, and shown on FIG. 14E, is compared with the protected data in comparator 67. If the protected data (FIG. 14D) and the delayed hierarchy data (FIG. 14E) do not coincide, comparator 67 supplies a mismatch output signal to output terminal 61. In one embodiment, such mismatch output signal from comparator 67 is "1" to indicate lack of coincidence. Thus, as illustrated in FIG. 14F, the mismatch output signal is "1" only during the period when the erroneous hierarchy data $L_1$, corresponding to a previous recording, is generated. With the reference to the circuit of FIG. 11, the mismatch output signal appears at the change point of the normal hierarchy data. It is to be appreciated that an error flag is not forceably set by the circuit of FIG. 13.

It will be further appreciated from the above description that even if an erasing or recording omission occurs because of the presence of dust during a re-recording operation, the previously recorded data included in the reproduced data can be detected simply by detecting the corresponding hierarchy data. Accordingly, an appropriate error correction operation can be performed.

The present invention is not limited in its application to hierarchy data comprised of 3-bits, and can be applied to hierarchy data made up of any number of bits. In addition, the hierarchy data is not limited to data which changes plus 1 by plus 1. It is possible to use hierarchy data which changes in a circulating fashion in accord with a regular rule such as plus 2 by plus 2 or the like. Since the hierarchy data coincides at the end of a circulating period for such hierarchy data, it could happen that the previously recorded data and the new data coincide. However, such a coincidence rarely occurs in practice, and can be neglected in considering the operation of the present invention.

The above described embodiments of the present invention are applied to a PCM tape recorder with a fixed head system. It is to be appreciated that the present invention is not limited to such a tape recorder, and can be applied to a tape recorder with a rotary head system. It is also possible to apply the present invention to a disk recording and/or reproducing apparatus having a magnetic or optical reading system. The present invention is, of course, not limited to an audio PCM signal, but can be applied to the recording and reproducing of other digital information signals, such as video PCM signals and the like.

Although specific embodiments of the present invention have been described in detail herein with reference to the accompanying drawings, it is to be understood that the invention is not limited to those precise embodiments, and that various changes and modifications may be effected therein by one skilled in the art without departing from the spirit and scope of the invention as defined in the appended claims.

What is claimed is:

1. Apparatus for recording digital signals on a track on a magnetic record medium and for reproducing said digital signals therefrom, wherein during a first recording operation a first digital signal may be recorded on said track and during a second operation thereafter a second digital signal may be recorded on said track to replace said recorded first digital signal, said apparatus comprising:

code generating means for generating respective discriminating code signals in association with said first and second digital signals, respectively;

recording means for recording a selected one of said first and second digital signals and its respective discriminating code signal on said track to constitute a recorded selected digital signal;

reproducing means for reproducing any digital signals and their respective discriminating code signals from said track; and error identifying means responsive to the reproduced discriminating code signals for identifying an error condition when a digital signal other than said recorded selected digital signal is reproduced from said track, and for generating a detection signal thereupon;

said first and second digital signals consisting of consecutive data blocks organized in sets of n data blocks, said code generating means supplying the same discriminating code signal to all data blocks within each of said sets, and said error identifying means identifying said error condition when the reproduced discriminating code signals for n successively reproduced data blocks are not all identical; and wherein said discriminating code signal is the same for all of said sets of data blocks within each said digital signal.

2. Apparatus for recording digital signals on a track on a magnetic record medium and for reproducing said digital signals therefrom, wherein during a first recording operation a first digital signal may be recorded on said track and during a second operation thereafter a second digital signal may be recorded on said track to replace said recorded first digital signal, said apparatus comprising:

code generating means for generating respective discriminating code signals in association with said first and second digital signals, respectively;

recording means for recording a selected one of said first and second digital signals and its respective discriminating code signal on said track to constitute a recorded selected digital signal;

reproducing means for reproducing any digital signals and their respective discriminating code signals from said track; and error identifying means responsive to the reproduced discriminating code signals for identifying an error condition when a digital signal other than said recorded selected digital signal is reproduced from said track, and for generating a detection signal thereupon;

said first and second digital signals consisting of consecutive data blocks organized in sets of n data blocks, said code generating means supplying the same discriminating code signal to all data blocks within each of said sets, and said error identifying means identifying said error condition when the reproduced discriminating code signals for n successively reproduced data blocks are not all identical; and wherein within each said digital signal the discriminating code signal for a plurality of said sets of said data blocks is different from the discriminating code signal for a second plurality of said sets of data blocks.

3. The apparatus of claim 2; wherein said code generating means randomly generates said discriminating code signals.

4. Apparatus for recording digital signals on a track on a magnetic record medium and for reproducing said digital signals therefrom, wherein during a first recording operation a first digital signal may be recorded on said track and during a second operation thereafter a second digital signal may be recorded on said track to replace said recorded first digital signal, said apparatus comprising:

code generating means for generating respective discriminating code signals in association with said first and second digital signals, respectively;

recording means for recording a selected one of said first and second digital signals and its respective discriminating code signal on said track to constitute a recorded selected digital signal;

reproducing means for reproducing any digital signals and their respective discriminating code signals from said track; and error identifying means responsive to the reproduced discriminating code signals for identifying an error condition when a digital signal other than said recorded selected digital signal is reproduced from said track, and for generating a detection signal thereupon;

said first and second digital signals consisting of consecutive data blocks organized in sets of n data blocks, said code generating means supplying the same discriminating code signal to all data blocks within each of said sets, and said error identifying means identifying said error condition when the reproduce discriminating code signals for n successively reproduced data blocks are not all identical;

said reproducing means including transducer means for reproducing said digital signal recorded in said track on said magnetic record medium and decoding means for decoding said reproduced digital signal in response to said detection signal to produce a decoded digital signal;

wherein said error identifying means includes:

delay means for delaying at least the discriminating code signal associated with each said reproduced data block to produce successive delayed signals;

comparator means for comparing the delayed signal with a current discriminating code signal from a next reproduced data block and generating a trigger pulse in response thereto; and pulse generating means for generating said detection signal in response to said trigger pulse.

5. Apparatus for recording digital signals on a track on a magnetic record medium and for reproducing said digital signals therefrom, wherein during a first recording operation a first digital signal may be recorded on said track and during a second operation thereafter a second digital signal may be recorded on said track to replace said recorded first digital signal, said apparatus comprising:

code generating means for generating respective discriminating code signals in association with said first and second digital signals, respectively;

recording means for recording a selected one of said first and second digital signals and its respective discriminating code signal on said track to constitute a recorded selected digital signal;

reproducing means for reproducing any digital signals and their respective discriminating code signals from said track; and error identifying means responsive to the reproduced discriminating code signals for identifying an error condition when a digital signal other than said recorded selected digital signal is reproduced from said track, and for generating a detection signal thereupon;

said first and second digital signals consisting of consecutive data blocks organize in sets of n data blocks, said code generating means supplying the same discriminating code signal to all data blocks within each of said sets, and said error identifying means identifying said error condition when the reproduce discriminating code signals for n successively reproduced data blocks are not all identical;

said reproducing means including transducer means for reproducing said digital signal recorded in said track on said magnetic record medium and decoding means for decoding said reproduced digital signal in response to said detection signal to produce a decoded digital signal;

wherein said detector means comprises:

first delay means for delaying said discriminating code signal included in each said data block;

first comparator means for comparing the delay discriminating code signal with the current discriminating code signal and generating pulses in response thereto;

counter means for receiving said pulses from said comparator means and generating control signals in response thereto;

second delay means for delaying said discriminating code signal associated with each said data block;

selector means for supplying one of said current discriminating code signal and the delayed discriminating code signal from said second delay means in response to said control signals from said counter means;

third delay means for delaying another discriminating code signal associated with each data block; and second comparator means for comparing the delayed discriminating code signal from said third delay means with said discriminating code signal from said selector means and generating said detection signal in response thereto.

6. Apparatus for recording digital signals on a track on a magnetic record medium and for reproducing said digital signals therefrom, wherein during a first recording operation a first digital signal may be recorded on said track and during a second operation thereafter a second digital signal may be recorded on said track to replace said recorded first digital signal, said apparatus comprising:

code generating means for generating respective discriminating code signals in association with said first and second digital signals, respectively;

recording means for recording a selected one of said first and second digital signals and its respective discriminating code signal on said track to constitute a recorded selected digital signal;

reproducing means for reproducing any digital signals and their respective discriminating code signals from said track; and error identifying means responsive to the reproduced discriminating code signals for identifying an error condition when a digital signal other than said recorded selected digital signal is reproduced from said track, and for generating a detection signal thereupon;

said first and second digital signals consisting of consecutive data blocks organize in sets of n data blocks, said code generating means supplying the same discriminating code signal to all data blocks within each of said sets, and said error identifying means identifying said error condition when the reproduce discriminating code signals for n successively reproduced data blocks are not all identical;

said reproducing means including transducer means for reproducing said digital signal recorded in said track on said magnetic record medium and decoding means for decoding said reproduced digital signal in response to said detection signal to produce a decoded digital signal;

wherein said error identifying means includes:

first delay means for delaying at least the discriminating code signal associated with each said reproduced data block by a time corresponding to one data block to produce successive delay signals;

first comparison means for comparing each delayed signal with the discriminating code signal from the next successive reproduced data block and for generating an output signal indicative of the result of said comparison;

detection means for receiving said output signal and generating a control signal when said output signal indicates that the two compared signals are identical;

selector means receiving said control signal and said discriminating code signal from said next successive reproduced data block and having an output terminal;

second delay means connected to said output terminal of said selector means for delaying an output signal therefrom by said period of time corresponding to one data block to produce a first delayed output signal;

said selector means further receiving said first delayed output signal and producing at its output terminal a selected one of said first delayed output signal and said discriminating code signal from said next successive reproduced data block in response to said control signal;

third delay means for delaying said discriminating code signal from said next successive reproduced data block by a period of time corresponding corresponding to n+1 data blocks to produce a second delayed output signal; and second comparison means for comparing the second delayed output signal of said third delay means and the output signal of said selector means and for generating said detection signal in response thereto.

7. Apparatus for recording digital signals on a track on a magnetic record medium and for reproducing said digital signals therefrom, wherein during a first recording operation a first digital signal may be recorded on said track and during a second operation thereafter a second digital signal may be recorded on said track to replace said recorded first digital signal, said apparatus comprising:

code generating means for generating respective discriminating code signals in association with said first and second digital signals, respectively;

recording means for recording a selected one of said first and second digital signals and its respective discriminating code signal on said track to constitute a recorded selected digital signal;

reproducing means for reproducing any digital signals and their respective discriminating code signals from said track; and error identifying means responsive to the reproduced discriminating code signals for identifying an error condition when a digital signal other than said recorded selected digital signal is reproduced from said track, and for generating a detection signal thereupon;

said first and second digital signals consisting of consecutive data blocks organized in sets of n data blocks, said code generating means supplying the same discriminating code signal to all data blocks within each of said sets, and said error identifying means identifying said error condition when the reproduced discriminating code signals for n successively reproduced data blocks are not all identical;

said reproducing means including transducer means for reproducing said digital signal recorded in said track on said magnetic record medium and decoding means for decoding said reproduced digital signal in response to said detection signal to produce a decoded digital signal;

wherein said first digital signal and its respective discriminating code signal have been recorded on said record medium in said first recording operation and in which said reproducing means and said recording means operate simultaneously to reproduce digital signals from said record medium at a first position and to record digital signals on said record medium at a second position, said apparatus further comprising;

means for supplying said second digital signal; and signal processing means supplied with said second digital signal and said decoded digital signals corresponding to said first digital signal for generating a mixed digital signal;

said code generating means generating a discriminating code signal to be associated with said second digital signal in dependence on said discriminating code signal from said first digital signal;

said recording means being supplied with said mixed digital signal and said identifying code signal associated with said second digital signal for recording the same on said record medium.

8. Apparatus according to claim 7, wherein said signal processing means includes cross fading means, and said mixed signal is constituted initially by said first digital signal, then by said first digital signal cross faded with said second digital signal for a predetermined interval, and finally by said second digital signal.

9. Apparatus according to claim 7, wherein said signal processing means includes selection means for selecting one of said first and second digital signals to constitute said mixed signal.

10. Apparatus according to claim 7, wherein said reproducing means includes encoding means for encoding said mixed digital signal and said identifying code signal associated with said second digital signal into said data blocks for recording.

11. Apparatus according to claim 7, wherein said error identifying means includes:

first delay means for delaying at least a discriminating code signal associated with each said reproduced data block to produce successive delayed signals;

comparator means for comparing the delayed signal with a current discriminating code signal from a mixed reproduced data block and generating a trigger pulse in response thereto;

pulse generating means for generating said detecting signal in response to said trigger pulse;

selector means receiving said detection signal and said identifying code signal from said next successive reproduced data block and having an output terminal;

second delay means connected to said output terminal of said selector means for delaying an output signal therefrom by said period of time corresponding to one data block to produce a delayed output signal;

said selector means further receiving said delayed output signal and producing at its output terminal a selected one of said first delayed output signal and said identifying code signal from said next successive reproduced data block in response to said detection signal;

said selected one of said first delayed output signal and said identifying said code signal from said next successive reproduced data block being supplied to said decoding means.

12. The apparatus of claim 7, wherein said error identifying means includes:

first delay means for delaying at least the discriminating code signal associated with each said reproduced data block by a time corresponding to one data block to produce successive delayed signals;

first comparison means for comparing each delayed signal with the discriminting code signal from the next successive reproduced data block and for generating an output signal indicative of the result of said comparison;

detection means for receiving said output signal and generating a control signal when said output signal indicates that the two compared signals are identical;

selector means receiving said control signal and said discriminating code signal from said next successive reproduced data block and having an output terminal;

second delay means connected to said output terminal of said selector means for delaying an output signal therefrom by said period of time corresponding to one data block to produce a first delayed output signal;

said selector means further receiving said first delayed output signal and producing at its output terminal a selected one of said first delayed output signal and said discriminating code signal from said next successive reproduced data block in response to said control signal;

third delay means for delaying said discriminating code signal from said next successive reproduced data block by a period of time corresponding to $n+1$ data blocks to produce a second delayed output signal; and second comparison means for comparing the second delayed output signal of said third delay means and the output signal of said selector means and for generating said detection signal in response thereto.

* * * * *